Patented Mar. 18, 1952

2,589,211

UNITED STATES PATENT OFFICE 2,589,211

AMINOPHENYLSULFONYLPHENYLAMINO-ALKANOIC ACIDS

Albert L. Rawlins, Grosse Pointe Woods, Mich., assignor to Parke, Davis & Company, Detroit, Mich., a corporation of Michigan No Drawing. Application November 23, 1948, Serial No. 61,742

5 Claims. (Cl. 260—397.6)

This application is a continuation-in-part of my copending application Serial No. 481,007, filed March 29, 1943, now Patent No. 2,454,835, issued November 30, 1948, and the invention relates to substituted diamino diphenyl sulfones and to processes for obtaining the same. More particularly, the invention relates to substituted diamino diphenyl sulfones characterized by one free amino group and an amino group bearing a residue of a lower aliphatic carboxylic acid or ester bound to the amino group by a carbon-nitrogen bond. These products have the general formula,

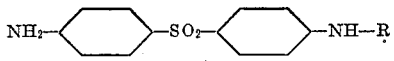

where R represents a residue of a lower aliphatic carboxylic acid or ester bound to the nitrogen atom by a carbon-nitrogen bond.

The products of the above general formula form water-soluble salts with both inorganic and organic acids. The products containing a free carboxylic acid group also form water soluble salts with alkalis. Some examples of the alkaline type salts formed by the compounds containing a free carboxylic acid group are the sodium, potassium, ammonium, lithium, magnesium and the like salts. Some of the acid type of salts formed by all of the products are the hydrochloride, hydrobromide, hydroiodide, sulfate, sulfamate, acetate, propionate and the like salts. The new products and their water soluble salts are valuable therapeutic agents and intermediates for therapeutic agents. They are generally effective against diseases and infections caused by micro-organisms such as streptococci, staphylococci, pneumococci and mycobacterium tuberculosis. Many of them are effective as antiseptics upon oral administration. They are of low toxicity and very stable chemically.

In accordance with the invention these products are produced by reacting p,p'-diamino diphenyl sulfone with a halogenated lower aliphatic acid or ester as illustrated by the following diagram:

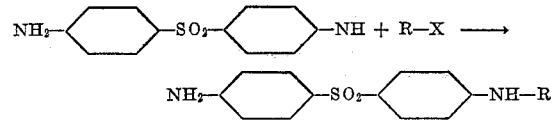

where R has the same significance as given above and X is a halogen atom. When a halogenated lower aliphatic acid ester is employed as the starting material the carbalkoxyalkyl substituted diamino sulfone can be converted, if desired, to the corresponding p-amino-p'-(carboxyalkylamino) diphenyl sulfone by hydrolysis.

The invention is illustrated by the following examples:

*Example 1.—p-Amino-p'-β-(carboxyethylamino) diphenyl sulfone*

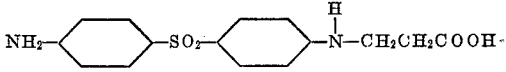

100 grams of 4,4'-diamino diphenyl sulfone, 260 grams of ethyl β-bromopropionate and 700 cc. of alcohol are mixed together and refluxed for 18 hours. The alcohol and excess ethyl β-bromopropionate are then distilled off on a steam bath under reduced pressure. The residue consisting of the hydrochloride salt of p-amino-p'-(β-carbethoxyethylamino) diphenyl sulfone is mixed with 1,000 cc. of alcoholic KOH (10%) and refluxed for 3 hours on the steam bath. Most of the alcohol is removed by distillation and the residue consisting of the potassium salt of p-amino-p'-(β-carboxyethylamino) diphenyl sulfone diluted with 10 volumes of water. It is then filtered by gravity and dilute HCl added until no more separation occurs. The thick, viscous precipitate, which is soluble both in acid and alkali, is dissolved in 10% HCl and charcoaled. After filtering from the charcoal, the filtrate containing the hydrochloride salt of p-amino-p'-(β-carboxyethylamino) diphenyl sulfone is neutralized and the precipitate dried under reduced pressure in the steambath. The dried residue is extracted with acetone and the acetone removed from the extract under reduced pressure on the steambath. The residue is then dried in a vacuum desiccator over $P_2O_5$. 35 grams of a yellow solid is obtained melting at 75° C. (after first becoming more compact at 65° C.). The properties and analyses of the produce show it to be the desired p-amino-p'-(β-carboxyethylamino) diphenyl sulfone.

*Example 2.—p-Amino-p'-(α-carboxy-n-propylamino) diphenyl sulfone*

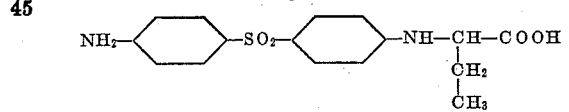

A mixture consisting of 24.8 g. of p,p'-diamino diphenyl sulfone, 30 g. of ethyl α-bromobutyrate and 200 cc. of alcohol is refluxed for twenty hours and then the alcohol and excess halogenated ester removed by distillation in vacuo. The residue which consists of the hydrobromide salt of p-amino-p'-(α-carbethoxy)-n-propylamino diphenyl sulfone is mixed with 350 cc. of 10% alcoholic sodium hydroxide and the mixture refluxed for about four hours. The alcohol is removed by distillation in vacuo and the residual sodium salt of p-amino-p'-(α-carboxy)-n-propylamino diphenyl sulfone precipitated from the filtrate by the addition of dilute hydrochloric acid. The crude acid can be purified by dissolving it in dilute hydrochloric acid, charcoaling the solution and liberating the free acid from the hydrochloride salt by the addition of alkali. The product so obtained is extracted with acetone, the acetone solution dried and the acetone distilled to obtain the pure acid as a light yellow solid.

*Example 3.—p-Amino-p'-(carboxymethylamino) diphenyl sulfone*

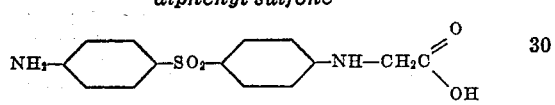

24.8 g. of p,p'-diamino diphenyl sulfone and 150 g. of methyl chloroacetate in 150 cc. of alcohol are refluxed together for twenty-four hours and then the alcohol and excess halo ester distilled in vacuo. The residue which consists of the hydrochloride salt of p-amino-p'-(carbomethoxymethylamino) diphenyl sulfone is mixed with an alcoholic solution containing 2.5 g. of lithium hydroxide and the mixture refluxed for four hours. The alcohol is removed by distillation in vacuo and the residual lithium salt of p-amino-p'-(carboxymethylamino) diphenyl sulfone taken up in water. The solution is filtered and the filtrate acidified until no more precipitation occurs. The p-amino-p'-(carboxymethylamino) diphenyl sulfone thus obtained is collected and dried.

The hydrobromide salt of this product may be prepared, if desired, by dissolving the free acid in acetone, adding an equivalent amount of hydrogen bromide dissolved in acetone to the solution and distilling off the acetone.

The sodium salt of p-amino-p'-(carboxymethylamino) diphenyl sulfone is prepared by dissolving the free acid in an aqueous solution containing one equivalent of sodium hydroxide and evaporating the solution to dryness in vacuo.

*Example 4.—p - Amino - p' - (β - carboxy - n - propylamino) diphenyl sulfone*

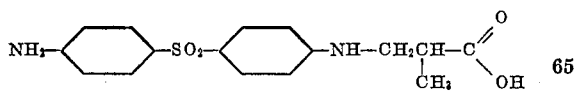

A mixture consisting of 24.8 g. of p,p'-diamino diphenyl sulfone, 25 g. of isopropyl α-methyl-β-bromopropionate and 200 cc. of isopropanol is refluxed for twenty hours and then the isopropanol and excess halo ester removed by distillation in vacuo to obtain the hydrobromide salt of p - amino - p' - (β-carboisopropoxy-n-propylamino) diphenyl sulfone. The residue is mixed with an alcoholic solution containing 5.6 g. of potassium hydroxide and the mixture refluxed for five hours. The alcohol is removed by distillation in vacuo and the residue which consists chiefly of the potassium salt of p-amino-p'-(β-carboxy-n-propylamino) diphenyl sulfone taken up in water. The solution is treated with charcoal, filtered and the desired p-amino-p'-(β-carboxy-n-propylamino) diphenyl sulfone precipitated from the filtrate by the addition of dilute hydrochloric acid.

Some further examples of the products which can be produced by the use of the above described procedure are:

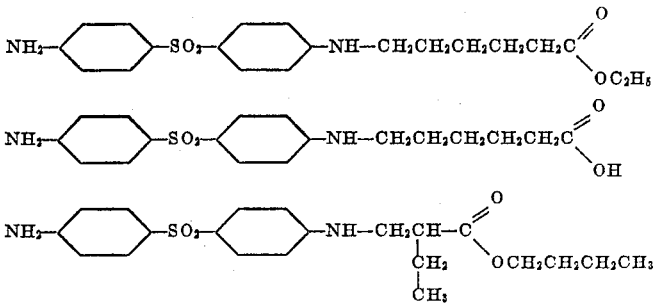

What I claim is:

1. A compound of the class consisting of a carboxylic acid, water soluble salts thereof, lower alkyl esters of said acid, and water soluble salts thereof, said carboxylic acid having the formula,

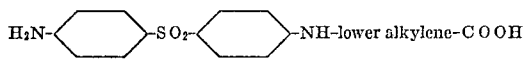

2. A compound having the formula,

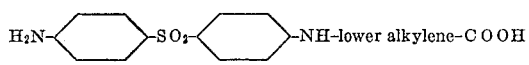

3. An alkali metal salt of a compound of formula,

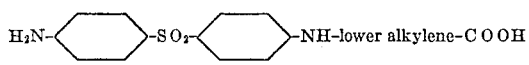

4. p-Amino-p'-(β-carboxyethylamino (diphenyl sulfone.

5. p-Amino-p'-(α-carboxy-n-propylamino) diphenyl sulfone.

ALBERT L. RAWLINS.

REFERENCES CITED

The following references are of record in the file of this patent:

UNITED STATES PATENTS

| Number | Name | Date |
|---|---|---|
| 2,224,156 | Kharasch et al. | Dec. 10, 1940 |
| 2,248,283 | Rarziss et al. | July 8, 1941 |
| 2,267,748 | Pohls et al. | Dec. 30, 1941 |

(Other references on following page)

UNITED STATES PATENTS

| Number | Name | Date |
|---|---|---|
| 2,300,677 | Kharasch et al. | Nov. 3, 1942 |
| 2,328,548 | Dohrn et al. | Sept. 7, 1943 |

FOREIGN PATENTS

| Number | Country | Date |
|---|---|---|
| 490,364 | Great Britain | Aug. 9, 1938 |
| 844,220 | France | Apr. 17, 1939 |
| 856,945 | France | Apr. 1, 1940 |

OTHER REFERENCES

Jackson et al., "J. Am. Chem. Soc.," Vol. 70, Feb. 1948, pp. 680–684.

Ciocca et al., "La Chimica e L'Industria (Italy), vol. 26, Nov. 1944, pp. 167 to 170.

Smith, "New York State Journal of Medicine," vol. 45 (1945), p. 1667.